July 15, 1947. E. VOGT 2,423,861
MEAT PACKAGE AND METHOD OF PREPARING THE SAME
Filed March 4, 1944 2 Sheets-Sheet 1
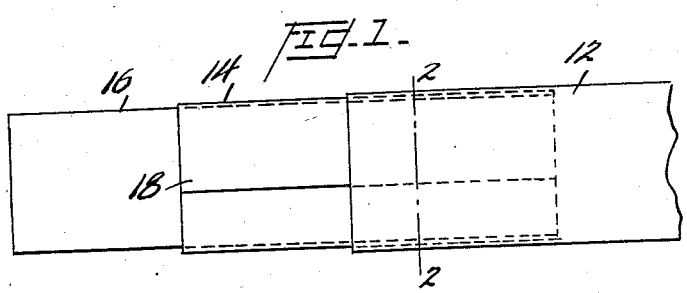
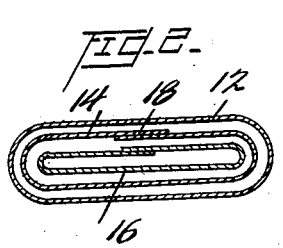 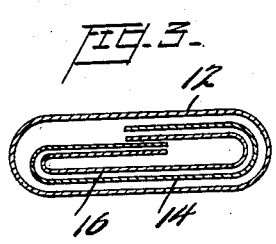 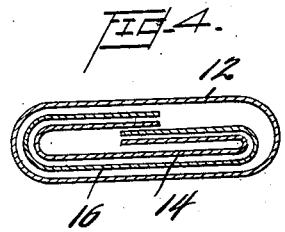
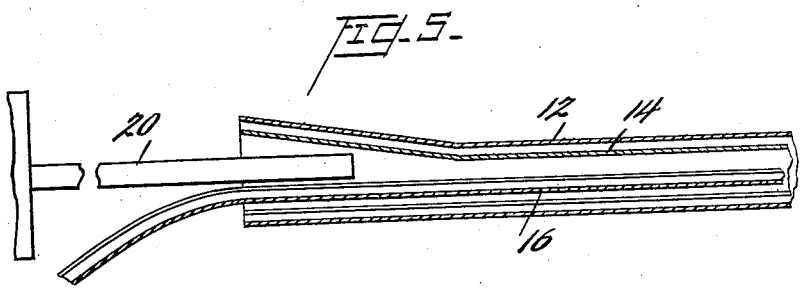
Inventor
Elsa Vogt,
By Strauch & Hoffman
Attorneys

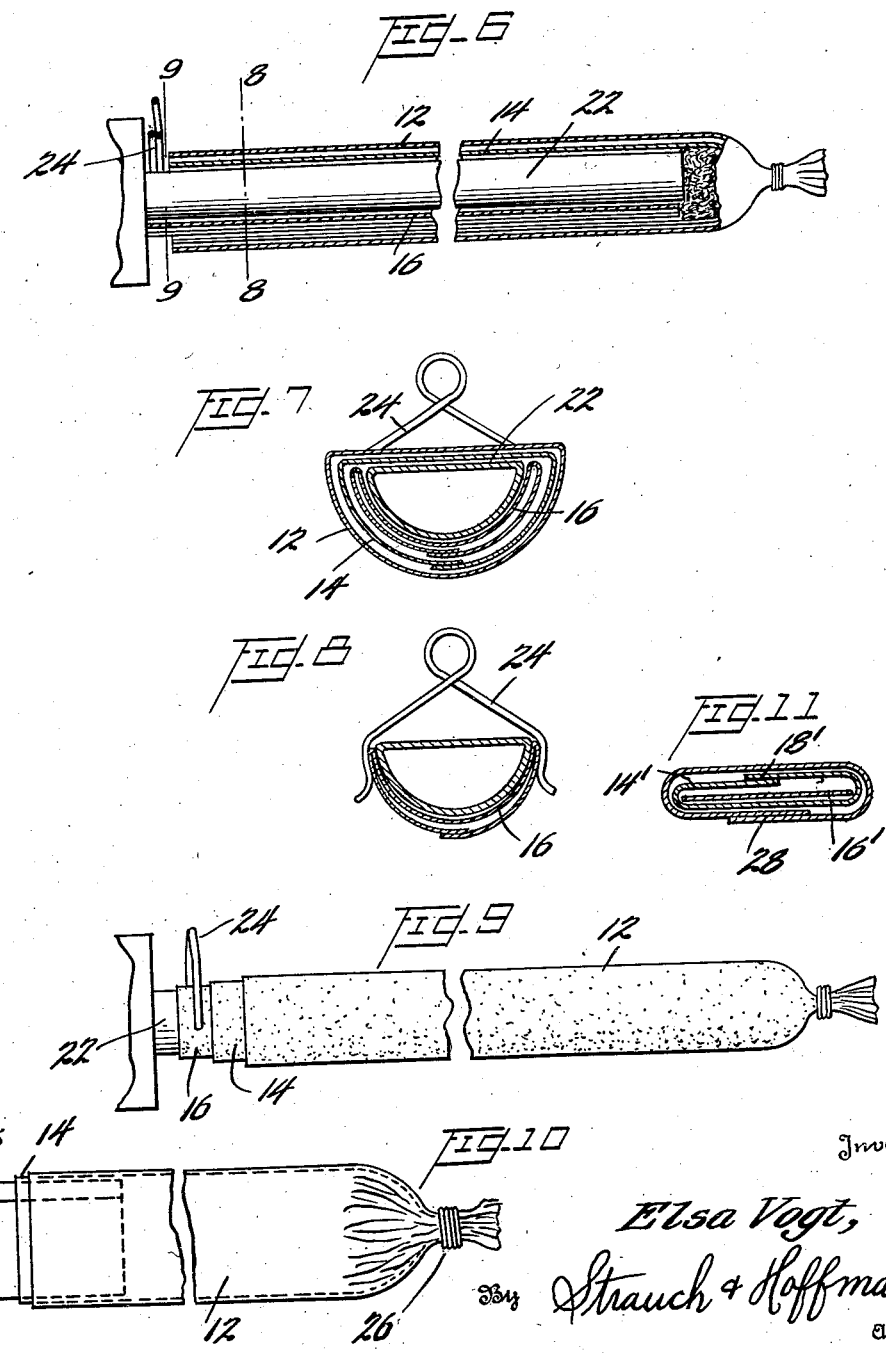

Patented July 15, 1947

2,423,861

UNITED STATES PATENT OFFICE 2,423,861

MEAT PACKAGE AND METHOD OF PREPARING THE SAME

Elsa Vogt, Philadelphia, Pa.

Application March 4, 1944, Serial No. 525,068

11 Claims. (Cl. 99—176)

This invention relates to improvements in meat packages and method of preparing the same and has particular reference to improved method of providing a moisture-proof lining within a tubular casing in which the meat is packed.

An object of the invention resides in the provision of an improved method for conveniently inserting lining strips into long tubular casings in a manner such that the strip will be properly positioned in the casing with overlapping edge portions.

A further object resides in an improved method of lining casings by means of a lining retainer strip, wherein the retainer strip is left in the casing to maintain the liner in position until it is desired to fill the casing and the retainer strip may then be readily removed from the casing leaving the lining intact.

A still further object resides in an improved method of providing sausage casings with expansible linings of moisture-proof material.

Other objects and advantages will be more particularly pointed out hereinafter or will become apparent as the description proceeds.

In the accompanying drawings, in which like reference numerals are used to designate similar parts throughout, there is illustrated a suitable embodiment for disclosing the invention and three somewhat modified forms thereof. The drawings, however, are for the purpose of illustration only and are not to be taken in a limiting or restricting sense since it will be apparent to those skilled in the art that various changes in the illustrated embodiments may be resorted to without exceeding the scope of the invention.

In the drawings:

Figure 1 is a plan view of a casing, a liner and a liner retainer strip in partly assembled relationship;

Figure 2 is a sectional view on the line 2—2 of Figure 1;

Figure 3 is a sectional view similar to Figure 2 showing a somewhat modified form of liner and liner strip assembly;

Figure 4 is a view similar to Figure 2 showing a still further modified form of liner and liner strip assembly;

Figure 5 is a somewhat diagrammatic sectional view showing an initial step in the method of inserting a stuffer horn into a lined casing and removing the liner retaining strip therefrom;

Figure 6 is a somewhat diagrammatic longitudinal sectional view of a modified method of applying the lined casing to a stuffing machine stuffer horn;

Figure 7 is a sectional view on the line 8—8 of Figure 6;

Figure 8 is a sectional view on the line 9—9 of Figure 6;

Figure 9 is a side elevational view of the modified method illustrated in Figure 6 at a later stage during the filling of the casing;

Figure 10 is a plan view of a somewhat modified form of lined sausage casing; and Figure 11 is a cross-sectional view of a modified form of lined small casing of the sort generally used for packing link sausages or frankfurters.

Referring to the drawings in detail and particularly to Figures 1 and 2, a tubular casing 12 such as a "Visking" casing is provided with a liner 14 of moisture-proof material in the form of an elongated strip having overlapping edge portions. In order to insert the lining strip 14 into the casing 12, it is first wound about a liner carrier strip or slip sheet 16 of heavy, relatively stiff paper, this paper carrier strip being of a width such as to be freely received in the tubular casing 12 when the casing is flattened. After the lining 14 has been wound about the carrier strip or slip sheet 16 this assembly is inserted into the tubular casing for the full length of the casing. The strip 16 may be a single thickness of heavy paper or it may be a double thickness of somewhat lighter paper in flattened tubular form and having longitudinally extending overlapping edges, as shown in Figure 2. As is clearly illustrated in Figures 1 and 2, the liner 14 is wrapped around the slip sheet 16 in a manner such that the edge portions of the liner overlap, as indicated at 18. The liner strip may be folded longitudinally of the carrier strip or may be spirally wrapped if desired. After the liner and retainer strip assembly has been inserted in the casing, the complete unit may be stored in flat condition and may be sold to the trade as lined casings in this form to constitute inclosures for meat product packages.

When it is desired to fill the casing, one end of the casing is tied off to provide a substantially moisture-proof seal. The lined casing is then dampened in order to render the outer casing somewhat elastic or expansible, care being taken that no water enters the open end of the casing. A stuffer horn 20 of a stuffing machine, not illustrated, is then inserted into the open end of the casing between one side of the slip sheet 16 and the adjacent portion of the liner strip 14, the slip sheet being bent or buckled across its width to a trough shaped condition to provide an opening for the end of the stuffer horn. The lined casing is then drawn upon the stuffer and the casing is then filled with comminuted meat product entering the casing through the stuffer horn and as the filling proceeds the casing is gradually forced off of the horn until the casing is completely filled. As the casing is forced off the stuffer horn the slip sheet is withdrawn. When the casing is filled, the open end is then also tied to provide a moisture proof seal and the outer casing 12 allowed to dry out and to shrink upon the material which has been filled into the casing. The meat within the casing is then completely surrounded by the moisture-proof liner which is forced into close contact with the surface of the meat by the shrinking of the outer casing. No moisture can then enter or leave the casing and oxidation of the surface of the meat by the atmosphere is effectively prevented. If desired, a small piece of beef fat or suet may be placed in the tied off end of the casing before the filling begins and a similar piece placed in the other end of the casing after the casing is filled and before that end is tied off in order to insure leak proof seals at the ends of the casing.

In the modified arrangement shown in Figure 3, an edge portion of the paper slip sheet is folded over an edge portion of the liner strip and the liner strip is then wrapped about the slip sheet so that the opposite edge portion overlaps the portion folded into the slip sheet. This provides a firmer retention between the slip sheet and the liner, particularly in the case of large casings, so that a uniform overlap of the edge portions of the liner is assured.

In both Figures 2 and 3, the liner is wrapped about the outer side of the slip sheet. However, it is entirely possible to provide an insert by folding the liner on the inner side of the slip sheet as is shown in Figure 4. In this case the slip sheet may be folded between the overlapping edge portions of the liner or the liner may be overlapped entirely within the folded slip sheet and the slip sheet may entirely surround the liner or may extend across one side only with edge portions folded over the edge portion of the liner or with an edge portion folded between the overlapping edge portions of the liner strip. With such an arrangement an elongated filler horn or tube may be used and the casing with the liner and slip sheet included drawn over the filler tube. Then as the filling of the casing proceeds, the casing will move outwardly relatively to the tube and the slip sheet will be held stationary or moved out of the casing as the filling proceeds. The slip sheet will hold the liner definitely in place until the filling material is placed in the casing after which the material will hold the liner in place as the slip sheet is gradually removed.

The modified arrangement shown in Figures 6 to 9, inclusive, is particularly useful in filling long narrow casings such as those used for frankfurters or link sausages. In this arrangement the liner is wrapped about a retainer or slip sheet in the manner explained above with the overlapping edge portions of the liner in contact with each other. For filling, the casing, with the liner and the slip sheet in place, is mounted upon an elongated filler tube 22 of generally semi-circular cross section, the end of the stuffer horn or filler tube being inserted between the slip sheet and the continuous side of the liner, the slip sheet being bowed or buckled across its width, as illustrated in Figure 7, for this purpose. The casing is then drawn up onto the stuffer horn for substantially its entire length and the slip sheet is attached to the horn by some suitable means, such as the spring clip 24. Then, as the filling of the casing proceeds, the casing and the liner are gradually moved outwardly relative to the stuffer horn while the slip sheet is held in its original position and is gradually withdrawn from the casing, as is particularly indicated in Figure 9. When the casing is substantially filled it is slipped off of the filler horn leaving the slip sheet in place and the open end of the casing is then tied up to provide a moisture proof seal.

In the somewhat modified form of lined casing illustrated in Figure 10 after the liner 14 has been wrapped about the slip sheet 16, either entirely outside the slip sheet as shown in Figure 2, or with one edge folded into the slip sheet for large casings, as shown in Figure 3 or Figure 4, one end of the liner is held relative to the casing and the slip sheet withdrawn a small amount. The end portion of the casing is then thoroughly soaked, preferably without letting water enter the interior of the casing, and is tied with a piece of strong cord, as indicated at 26 to make a substantially air tight closure at the end of the casing.

After the casing end has been tied, securing the liner at the tied end of the casing, the paper slip sheet may be partially pulled out of the casing until only a piece is left in the casing to adequately support the liner at or adjacent the midportion and at the open end of the casing. The slip sheet is then cut off near the casing end leaving a portion projecting outside of the casing to provide only sufficient material to be readily grasped for removing the slip sheet from the casing entirely at the time the casing is filled, or to secure the slip sheet to the stuffing machine so that the end portion still in the casing will be drawn out of the casing as the casing is filled and removed from the machine.

This method of preparing the lined casings for sale provides, as an article of merchandise, a lined casing having one end properly closed, that is, by first thoroughly soaking and then tying the casing, and a minimum amount of the heavy paper slip sheet left in the casing. The weight of the casings is thus materially reduced for packaging and transportation and each casing is in condition for immediate use.

As is indicated by the dotted lines in Figure 10, it has been found desirable to provide the liners with a large overlap, particularly when used in large size casings since the casings stretch a large amount when filled while the moisture proof lining material has little if any stretch. Unless a large overlap is provided there is some tendency for the edges of the liner to separate thus disrupting the moisture proof seal around the casing contents materially reducing the safe keeping period. An overlap of substantially the entire width of the flattened casing has been found satisfactory for large size casings.

In order to prevent slipping of the liner while it is being inserted in the casing, the liner may be glued or pasted to the entering end of the slip sheet. The paste or glue is limited to a narrow zone at said end of the slip sheet or to spots at said end. This method of insuring correct positioning of the liner in the casing is used in assembling liners in relatively large casings. Complete separation of the liner from the slip sheet after insertion is preferably effected by moving the slip sheet and attached liner through the remote open end of the casing and then snipping off the glued or pasted portion of liner and strip by scissors or the like, the liner and strip being then withdrawn backwardly into proper position in the casing. Other like or equivalent ways of temporarily providing a connection between liner and slip strip to facilitate assembly of the casing, liner and strip will be obvious to those skilled in the art.

In the further modified form of the invention shown in Figure 11 the liner is wrapped upon a slip sheet 16' which may conveniently be made of a single thickness of heavy, stiff paper or light card board, with the liner edges overlapping, as indicated at 18', the liner itself being designated by 14'. The liner wrapped slip sheet is then placed upon a strip of casing material, preferably with the overlapping edge portions of the liner approximately along the center portion of the casing material strip. The casing material is then folded over the liner wrapped slip sheet and its overlapping edge portions, indicated at 28, are firmly cemented together to provide a tubular casing.

Such a cemented casing is easy and economical to manufacture as the entire operation may be performed, if desired, by a comparatively simple automatic machine and lined casings of any desired length and any desired ratio of length to flattened width may be produced and are entirely satisfactory for small casings where the bursting forces on the casing are not large.

If desired the ends of these casings may be tied off and all but a small portion of the slip sheet removed during the manufacturing process, as described above in relation to Figure 10.

The present invention may be considered as an improvement upon the subject matter disclosed in Patent No. 2,298,779 issued October 13, 1942, to Richard H. Vogt and is chiefly concerned with the provision of an improved method for inserting the moisture proof liners in the tubular casings and retaining the liners in place with their adjoining edges overlapping until the filling of the lined casings is completed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The method of inserting a liner strip of moisture impervious material into a tubular meat product casing of thin, foldable moisture absorbent material which comprises wrapping the strip of lining material about a retaining strip of relatively stiff material so that the edge portions of said strip overlap, and inserting the assembly of retaining strip and liner into the tubular casing.

2. The method of providing cased meat products which comprises wrapping a strip of moisture proof material about a strip of stiff paper of a width slightly less than the width of the flattened casing in a manner such that the edge portions of the strip of moisture proof material uniformly overlap; inserting the wrapped paper strip into the casing for the full length of the casing, inserting a stuffing machine stuffer horn between the paper strip and strip of moisture proof material; removing the paper strip while leaving the strip of moisture proof material in place in the casing to provide a liner therefor, and filling the lined casing with filling material injected through said stuffer horn.

3. The method of providing a cased meat package which comprises wrapping a strip of moisture proof lining material about a slip sheet of relatively stiff paper so that the edge portions of the lining strip uniformly overlap, inserting the slip sheet and lining assembly into a tubular casing, tying off one end of the casing, immersing the casing in water, removing the slip sheet and filling the lined casing with comminuted meat product, and tying off the other end of the casing and drying the casing to bring the lining firmly in contact with the surface of the meat product by shrinkage of the casing.

4. The method of preparing a lined comminuted meat casing which comprises wrapping a carrier strip of relatively stiff material about a folded strip of moisture proof lining material in a manner such that the edge portions of the strip of lining material uniformly but freely overlap, inserting the carrier strip and lining strip assembly into a tubular casing of moisture absorbent material and leaving said carrier strip in said casing to hold said lining strip in place therein until it is desired to fill said casing.

5. The method of providing a cased meat package which comprises wrapping a lining strip of moisture proof material about a carrier strip of material stiffer than the material of either said casing or said lining with the edge portions of said lining strip overlapping, inserting the carrier strip and lining strip assembly into a tubular casing of substantially the same length as said assembly; tying off one end of said casing, inserting a filler tube of substantially the same length as said casing through the open end of said casing between said carrier strip and said lining strip; securing said carrier strip stationary relative to said filler tube, and filling said casing from the tied off end thereof to move said casing and said liner away from said filler tube and said carrier strip.

6. The method of manufacturing a meat product container which comprises wrapping a strip of lining material about a preformed strip of relatively stiff material with the edges of the strip of lining material free and overlapping, wrapping a strip of casing material about the lining wrapped strip of relatively stiff material with the edges of said casing material overlapping; and cementing the overlapping edges of said casing material together.

7. The method of inserting a liner strip of moisture proof impervious material into a flexible tubular casing of thin foldable moisture absorbent shrinkable material by use of a relatively stiff elongated supporting means of slightly less width than the casing when flattened which comprises folding the edges of said strip of liner inward into overlapped relationship around said supporting means and into a width slightly smaller than the flattened width of said casing thereby supporting said folded strip by said means sufficiently to permit insertion in folded relation into said casing; inserting said means and said folded strip into said casing; and then removing said means leaving said folded overlapped strip positioned within said casing.

8. The method of preparing a lined comminuted meat casing which comprises interfolding a strip of moisture proof lining material and a thin strip of relatively stiff material of a width slightly less than the width of a flattened tubular casing of moisture absorbent material so that the edge portions of said lining material overlap and are free, inserting the interfolding strip of lining material and relatively stiff material into said tubular casing while in flattened condition, and leaving said strip of relatively stiff material in said casing to hold said lining in place until it is desired to fill said casing.

9. The method of preparing a lined comminuted meat casing which comprises wrapping a strip of moisture proof lining material about a thin strip of relatively stiff material of a width slightly less than the width of a flattened tubular casing of moisture absorbent material so that the edge portions of said lining material overlap and are free, folding an edge portion of said strip of relatively stiff material over an edge portion of said lining strip when said lining strip is wrapped about said strip of relatively stiff material, inserting the lining wrapped strip of relatively stiff material into said tubular casing while in flattened condition, and leaving said strip of relatively stiff material in said casing to hold said lining in place until it is desired to fill said casing.

10. A comminuted meat product enclosure comprising a flattened, flexible, moisture absorbent casing; a slip sheet comprising a flattened flexible tube having overlapping longitudinally extending free edges and being of a width slightly less than the width of the flattened casing; and a moisture proof lining strip wrapped about said slip sheet and having uniformly overlapping free edge portions, said slip sheet with the liner strip thereon being disposed within the flattened casing so the slip sheet may be removed as the lined casing is expanded and filled with comminuted meat.

11. An enclosure as set forth in claim 10 wherein one of said overlapping edges of said slip sheet is interposed between the overlapping edge portions of said lining strip.

ELSA VOGT.

REFERENCES CITED

The following references are of record in the file of this patent:

UNITED STATES PATENTS

| Number | Name | Date |
|---|---|---|
| 2,169,413 | Freeman | Aug. 15, 1939 |
| 2,207,793 | Freeman | July 16, 1940 |
| 2,298,779 | Vogt | Oct. 13, 1942 |
| 1,879,410 | Morris et al. | Sept. 27, 1932 |
| 2,252,106 | Waters | Aug. 12, 1941 |
| 2,135,132 | Boehmer | Nov. 1, 1938 |